Figure 1:
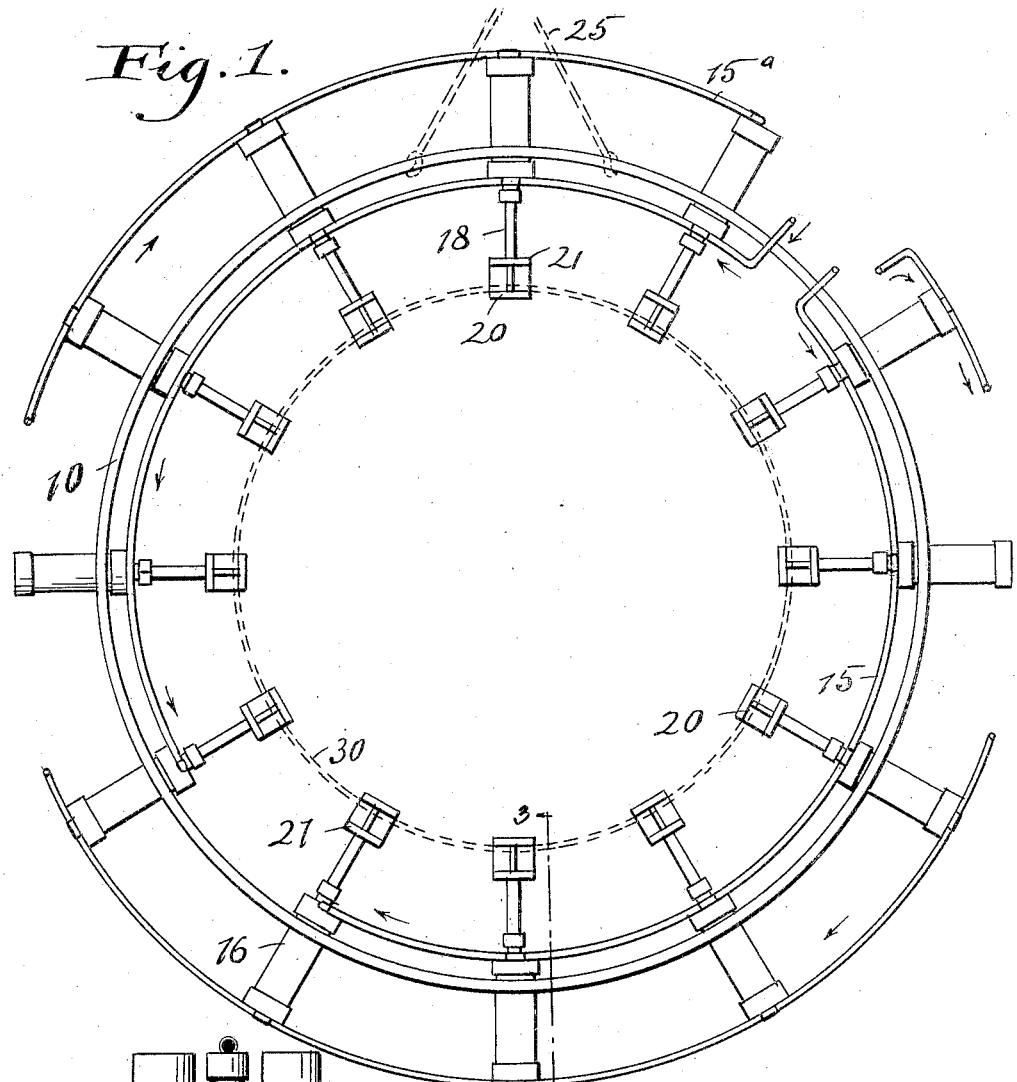

Sept. 4, 1923.

H. A. DENMIRE

FABRIC RING STRETCHING AND APPLYING DEVICE

Filed Feb. 3, 1921   2 Sheets-Sheet 1

1,467,143

Inventor
Harold A. Denmire
by
Thurston Kwiz Hudson
attys

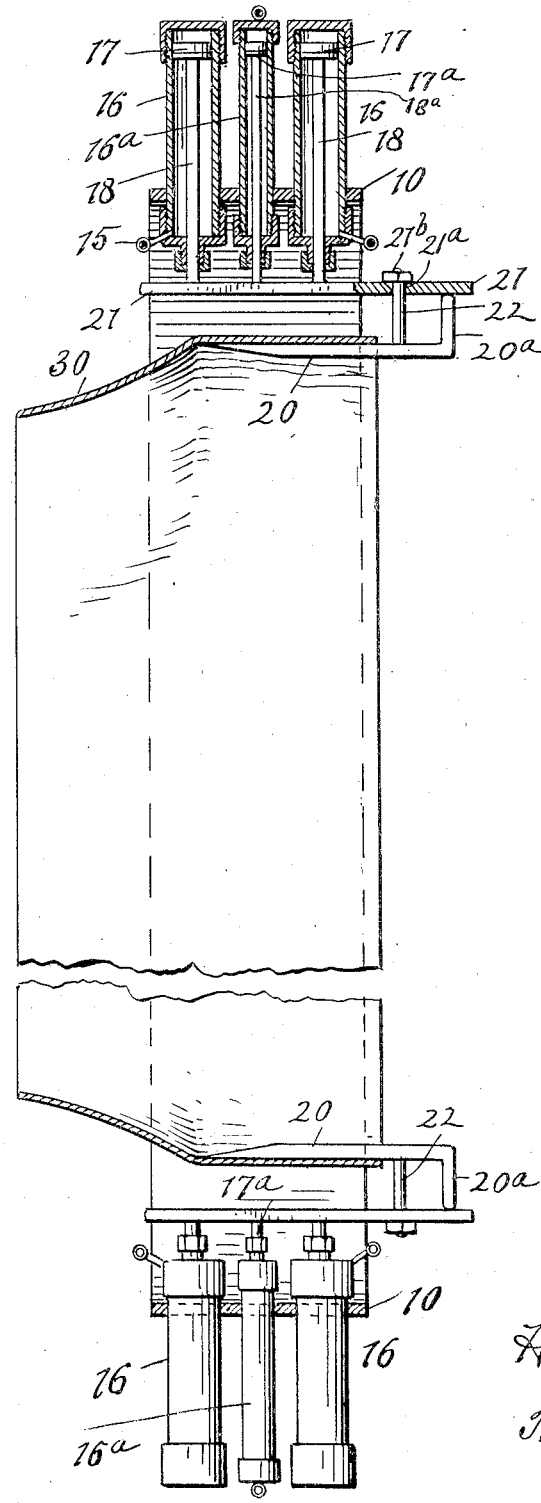

Patented Sept. 4, 1923.

1,467,143

UNITED STATES PATENT OFFICE.

HAROLD A. DENMIRE, OF AKRON, OHIO, ASSIGNOR TO THE GENERAL TIRE AND RUBBER COMPANY, OF AKRON, OHIO, A CORPORATION OF OHIO.

FABRIC-RING STRETCHING AND APPLYING DEVICE.

Application filed February 3, 1921. Serial No. 442,154.

*To all whom it may concern:*

Be it known that I, HAROLD A. DENMIRE, a citizen of the United States, residing at Akron, in the county of Summit and State of Ohio, have invented a certain new and useful Improvement in Fabric-Ring Stretching and Applying Devices, of which the following is a full, clear, and exact description.

There is a method of making pneumatic tire casings which consists in first making each ply of friction fabric up into the form of a flat ring of considerably smaller diameter than the core on which the tire casing is to be formed. The flat fabric ring so produced is manually stretched and pulled onto the core. This is hard work, and slow work, and, in addition, this method of stretching the friction fabric ring does not produce uniform stretching thereof. Therefore it is customary after the fabric ring has been placed upon the core to pull and haul on it until the stretching is distributed as nearly uniformly as possible.

The present invention is a mechanical contrivance by means of which the flat frictioned fabric rings may be uniformly stretched to the required degree and applied to the core; the invention consisting in the construction and combination of parts shown in the drawings and hereinafter described and pointed out definitely in the appended claims.

Figure 3:
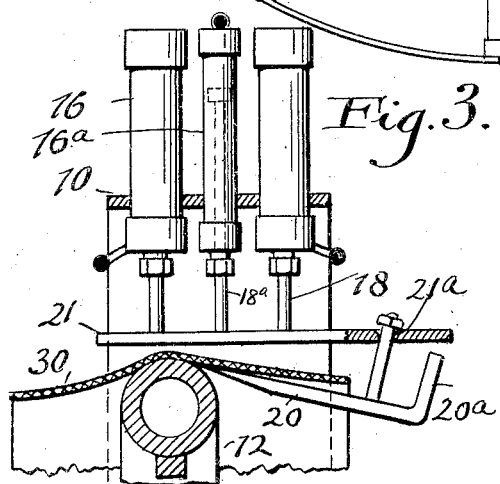
Figure 4:
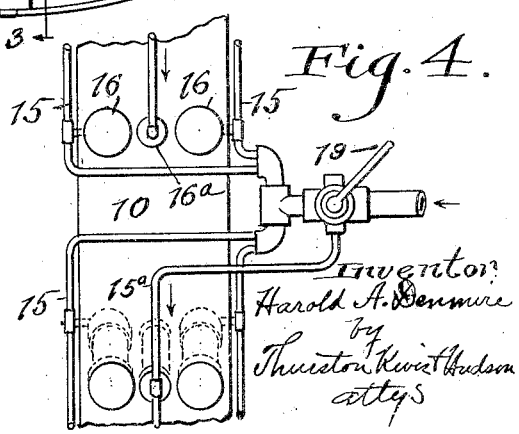

In the drawing, Fig. 1 is a side elevation of the fabric ring stretching and applying device; when the fabric ring is being engaged thereby but before the ring has been stretched. Fig. 2 is a diametrical section of the parts shown in Fig. 1, and of the core, when the fabric ring has been stretched for application to the core. Fig. 3 is a radial section on line 3—3 of Fig. 1 showing the position of the parts when the ring has just been applied to the core; and Fig. 4 is a plan view of the pipes and controlling valve therefor through which pressure fluid flows to and from the cylinders.

Referring to the parts by reference characters, 10 represents a cylindrical frame of considerably larger diameter than the core 12 in connection with which it is to be used. This frame carries a plurality of flat hooks 20 located within the frame and approximately at equal intervals. These hooks are supported by the frame and are associated with mechanism by which they may be simultaneously moved away from the axis of the frame so as to uniformly stretch a friction fabric ring which has been hung on the hooks when they were in what may be called the contracted positions.

In the specific construction shown each hook is associated with one or more radially disposed pneumatic cylinders 16 which are fixedly secured to the frame 10 and lying for most part outside thereof. Each of these cylinders is provided with a piston 17 and a piston rod 18 which extends toward the axis of the frame 10; and the base 21 of the hook is connected with these two piston rods. By admitting air to the inner end of the two pistons associated with each hook, the hook will be moved forcefully away from the axis of the frame.

In the construction as shown there are twelve of these hooks each being associated with the two cylinders for expanding them. All of the cylinders in one row may be connected by pipes 15 with a source of compressed air which may be controlled by a single valve 19 so that by the opening of that valve compressed air will be admitted simultaneously to all of the cylinders, so that all of the hooks will be simultaneously moved outward to the expanded position. In the construction shown each of these hooks is also associated with another cylinder $16^a$ provided with a piston $17^a$ and piston rod $18^a$, each piston rod being connected with a hook. The outer ends of these cylinders may be all connected together with a common source of compressed air supply by pipes $15^a$ and may be controlled by a valve, in fact, the one valve 19 being provided with passages adapted in different positions of the valve to place either of the pipes 15 or $15^a$ in communication with the pressure line and the other with the atmosphere, whereby the valve may control the flow of fluid to and from both sets of cylinders in such wise that when the compressed air is admitted to the hook expanding cylinders it will be allowed to escape from the hook contracting cylinders, and vice versa.

In the use of this contrivance the frame is movably suspended, as by chains 25 which allow considerable freedom of movement to the frame. When the hooks are in their contracted position, as shown in Fig. 1, a ring 30 of frictioned fabric is hung upon the hooks in substantially the manner shown, so that the hooks extend from one side of said ring 30 about to the middle thereof. Then the hooks are expanded thereby uniformly expanding the fabric ring. Then the entire frame is moved over the core until it occupies a position in relation thereto substantially as shown in Fig. 3, and then the hooks are allowed or caused to move toward their retracted positions. This deposits the center of the fabric ring upon the center of the core. The frame supporting the hooks may then be moved still further to the right thereby freeing the hooks from the fabric ring which is now on the core, and said fabric ring may then be stitched down upon the core in the usual way.

The hooks, or rather the fabric engaging parts 20 of the hooks is made separate from the base 21 thereof, and has an upturned flange 20ª at its rear end. A bolt 22 which is screwed into the hook member 20 goes loosely through a hole 21ª in the base member 21, and has a head 21ᵇ engaging the outer face of said base member. This furnishes a pivotal connection between the hook member 20 and the bar 21. The inward movement, beyond the position shown in Fig. 2, is prevented by the engagement of flange 20ª with the member 21. But when the hooks have all been moved to their retracted positions in order to apply the stretched fabric ring to the core, the fabric engaging ends of the hook members 20 may engage the core, and may swing to the position shown in Fig. 3. This assists in properly applying the fabric ring to the core, and facilitates the withdrawal of the hooks from the fabric ring.

Having described my invention, I claim:

1. An annular frame combined with a plurality of hooks, located inside of said frame and having portions adapted to engage the inner side of a fabric ring, and means for connecting the hooks with the frame, and for simultaneously moving all of said hooks away from the axis of the frame.

2. An annular frame combined with a plurality of hooks, located inside of said frame, and means for connecting the hooks with the frame, and for simultaneously moving all of said hooks away from the axis of the frame, and a core of such diameter that it may be made to lie within said annular frame when the hooks carried thereby are in their expanded positions.

3. An annular frame combined with a plurality of hooks, located inside of said frame, and means for connecting the hooks with the frame, and for simultaneously moving all of said hooks away from the axis of the frame, the means for connecting the hooks with the frame and for imparting the required movements to the hooks consisting of cylinders fixed to the frame, pistons therein, and piston rods extending from the inner ends of said cylinders and connected with said hooks.

4. An annular frame combined with a plurality of hooks, located inside of said frame, and means for connecting the hooks with the frame, and for simultaneously moving all of said hooks away from the axis of the frame, the means for connecting the hooks with the frame and for imparting the required movements to the hooks consisting of cylinders fixed to the frame, pistons therein, and piston rods extending from the inner ends of said cylinders and connected with said hooks, and other cylinders supported by said frame,—each having a piston and an inwardly directed piston rod which is connected with one of said hooks, means for simultaneously admitting pressure fluid to all of the cylinders of the first named group and for permitting the escape of pressure fluid from the cylinders of the second group,—and vice versa.

5. An annular frame combined with a plurality of hooks located inside of said frame, and means for connecting the hooks with the frame, and for simultaneously moving all of said hooks away from the axis of the frame, the means for connecting the hooks with the frame and for imparting the required movements to the hooks consisting of cylinders fixed to the frame, pistons therein, and piston rods extending from the inner ends of said cylinders and connected with said hooks, each hook comprising a plate to which the piston rods are attached and an inner fabric-engaging member having a pivotal connection with said plate, and means for limiting said pivotal action.

In testimony whereof, I hereunto affix my signature.

HAROLD A. DENMIRE.